(12) United States Patent
Lopez Jauregui

(10) Patent No.: US 11,448,620 B2
(45) Date of Patent: Sep. 20, 2022

(54) MOTORIZED SCANNER FOR INSPECTION WITH MAGNETOSTRICTIVE EMAT SENSORS

(71) Applicant: Borja Lopez Jauregui, Lynchburg, VA (US)

(72) Inventor: Borja Lopez Jauregui, Lynchburg, VA (US)

(*) Notice: Subject to any disclaimer, the term of this patent is extended or adjusted under 35 U.S.C. 154(b) by 0 days.

(21) Appl. No.: 17/075,792

(22) Filed: Oct. 21, 2020

(65) Prior Publication Data

US 2021/0140929 A1 May 13, 2021

Related U.S. Application Data

(60) Provisional application No. 62/933,118, filed on Nov. 8, 2019.

(51) Int. Cl.
*G01N 29/24* (2006.01)
*G01N 29/22* (2006.01)

(52) U.S. Cl.
CPC ....... *G01N 29/2412* (2013.01); *G01N 29/225* (2013.01)

(58) Field of Classification Search
CPC .. G01N 29/2412; G01N 29/225; G01N 29/28; G01N 2291/0425; G01N 2291/0426; G01N 2291/0427
See application file for complete search history.

(56) References Cited

U.S. PATENT DOCUMENTS

| | | | |
|---|---|---|---|
| 2009/0174399 A1* | 7/2009 | Vinogrador | G01N 29/2412 324/238 |
| 2013/0024067 A1* | 1/2013 | Troy | B25J 5/007 701/36 |
| 2016/0238564 A1* | 8/2016 | Owens | G01N 29/2412 |
| 2019/0187104 A1* | 6/2019 | Vinogradov | G01N 29/2412 |

* cited by examiner

*Primary Examiner* — Xin Y Zhong

(57) ABSTRACT

A system comprising a motorized scanner, a magnetostrictive EMAT sensor, and a mechanism to pressure-couple the sensor against the structure that is going to be ultrasonically inspected. The magnetostrictive EMAT sensor includes a magnet or magnets to provide a biasing field, an EMAT RF coil or coils to generate the RF field, a magnetostrictive strip under the coil or coils where the ultrasound is generated. Different magnet and coil configurations can be used to generate guided waves, such as shear horizontal and lamb waves, or bulk waves at different angles. The motorized scanner moves the sensor on the structure and stops at the desired inspection locations based on position readings. Once in position, a built-in device applies downward pressure on the sensor to pressure couple the magnetostrictive strip against the structure so the ultrasound can propagate within this structure and ultrasonic readings can be taken.

8 Claims, 6 Drawing Sheets

MOTORIZED SCANNER FOR INSPECTION WITH MAGNETOSTRICTIVE EMAT SENSORS

FIELD

This disclosure relates to the non-destructive inspection of sections of metallic and non-metallic structures using magnetostrictive EMAT sensors.

BACKGROUND INFORMATION

Inspection of structures using ultrasound generated with magnetostrictive EMAT technique is well-known and documented. A number of patents and extensive literature cover the use of static and scanning techniques to inspect pipes, plates, shells and other structures using magnetostrictive EMAT. Most of this work is based on the use of guided waves, but the magnetostrictive EMAT technique can also be applied for generation of bulk waves at different angles to cover smaller sections of material.

Since most materials are not magnetostrictive or have low magnetostriction, these techniques rely on adhering or pressure-coupling a strip of magnetostrictive material against the structure that is inspected. Once properly coupled, an EMAT sensor is positioned on top of the strip to generate ultrasound in the magnetostrictive material which is then transferred into the structure. On round structures such as pipes and tubes, it is possible to wrap around a collar that is tensioned or inflated to apply downward pressure on the stationary EMAT sensors mounted on strip sections under the collar to pressure-couple them against the structure. On structures that cannot be wrapped with a collar, the strip is normally coupled using adhesive or semi-solid liquid couplants, and the EMAT sensor is subsequently positioned behind the strip for static measurements or scanning.

This invention relates to a system that permits scanning a structure, position a magnetostrictive EMAT sensor with a built-in magnetostrictive strip on selected locations, and pressure-couple the sensor against the structure to take ultrasonic readings at different positions on the structure.

SUMMARY

In some embodiments, a non-destructive inspection system for metallic and non-metallic structures includes a magnetostrictive EMAT sensor comprising at least one biasing magnetic field, an RF coil, and a section of magnetostrictive strip mounted on a scanner that moves the said magnetostrictive EMAT sensor on the structure. An optional layer of malleable material can be added under the magnetostrictive strip to enhance coupling on structures with rough surfaces. A motorized scanner containing the magnetostrictive EMAT sensor moves to a position in the structure, applies pressure on the sensor against the structure, and takes an ultrasonic reading. The scanner can subsequently release the pressure, move to another location and take another reading, and repeat this sequence as many times as needed. The system is connected to an instrument that can pulse and read the ultrasonic measurements. The results from different readings can be analyzed separately or combined to create an image of the structure being inspected. The scanner can use magnetic forces to attach to ferromagnetic materials, a chain or strap to move around round tubes and semi-round structures, or vacuum forces to scan non-magnetic materials. The downward pressure on the magnetostrictive EMAT sensor can be generated with a manual or automated actuator. The scanner can include mechanical encoders, cameras, GPS or other positioning tools to determine its relative position on the structure, so the readings can be correlated to the dimensions and geometry of the structure.

DETAILED DESCRIPTION

This description of the exemplary embodiments is non-limiting and is intended to be read in connection with the accompanying drawings, which are to be considered part of the entire written description.

Ultrasonic guided waves and bulk waves are commonly used for inspection of solid structures. Guided waves are normally used to cover long expanses of relatively thin materials, while bulk waves are used to cover smaller sections.

Various means of ultrasonic transducers exist including piezoelectric, impact, lasers, and electromagnetic acoustic transducers (EMAT). EMAT transducers rely on Lorentz forces and/or magnetostriction to induce the ultrasound in the part using an RF coil (EMAT coil) and a biased magnetic field. Magnetostrictive EMAT sensors have been used for many decades in guided wave generation for inspection of pipes to cover distances of up to several hundred feet in each direction from a fixed transducer collar location.

The magnetostrictive EMAT sensor generates ultrasonic waves via the magnetostrictive effect by which a time-varying strain is induced in a ferromagnetic material by means of generating an alternating current in an EMAT coil in the presence of a biasing magnetic field that is perpendicular to the direction of wave propagation to generate shear-horizontal type waves, or parallel to the direction of wave propagation to generate Lamb waves, shear vertical waves, and surface waves.

When the material has low or no magnetostriction, magnetostrictive EMAT sensors use a strip of highly magnetostrictive material such as FeCo that is pressure coupled or adhered to the structure. The EMAT coil and the biasing magnetic field are positioned on top of this strip to induce the ultrasound in said strip, which is subsequently transferred into the part by virtue of being coupled together. The biasing magnetization of the strip adjacent to the EMAT coil may be achieved by swiping the magnetostrictive strip with a permanent magnet prior to the scan, or by utilizing at least one permanent magnet or electromagnet.

Figure 1:
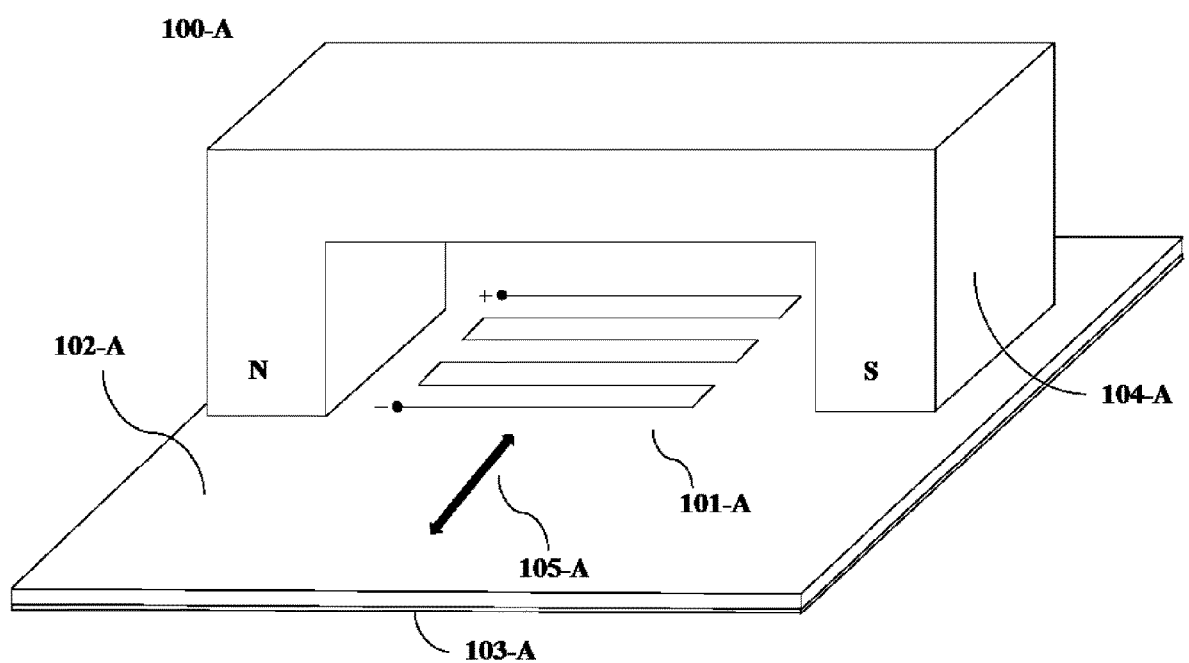
FIG. 1 is a conceptual illustration of a magnetostrictive EMAT sensor for generation of SH guided waves.

FIG. 1 shows a conceptual illustration of a sensor construction 100-A for generation of shear-horizontal guided waves in which a meander EMAT RF coil 101-A is placed on top of a magnetostrictive strip 102-A. A thin layer of malleable material such as aluminum or lead 103-A can be added to enhance coupling on rough structures. A biased magnetic field 104-A is located on top and perpendicular to the direction of wave propagation within the structure 105-A.

Figure 2:
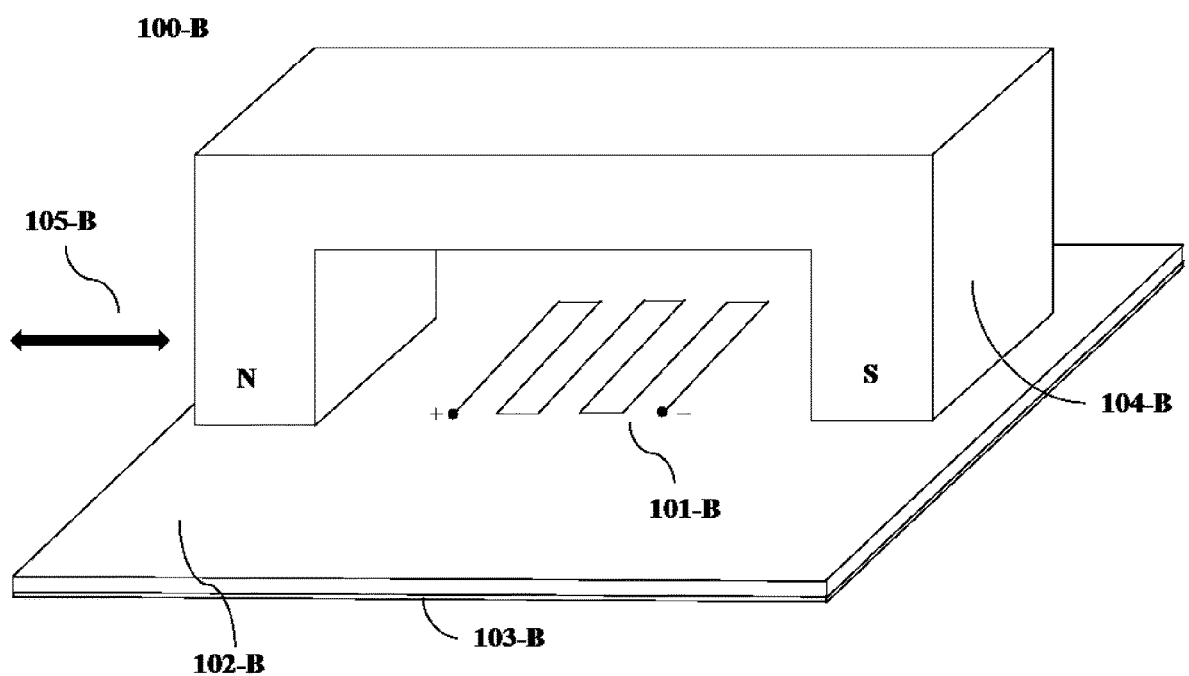
FIG. 2 is a conceptual illustration of a magnetostrictive EMAT sensor for generation of Lamb guided waves, shear vertical or surface waves.

FIG. 2 shows a conceptual illustration of a sensor construction 100-B for generation of Lamb guided waves, shear-vertical bulk waves and surface waves. A meander EMAT RF coil 101-B is placed on top of a magnetostrictive strip 102-B. A thin layer of malleable material such as aluminum or lead 103-B can be added to enhance coupling on rough structures. A biased magnetic field 104-B is located on top and parallel to the direction of wave propagation within the structure 105-B.

This disclosure relates to a motorized scanner that can move across the structure being inspected to any position of interest, and apply localized pressure to the magnetostrictive EMAT sensor to couple a strip built into the sensor, and take an ultrasonic reading. Once the reading is made, the pressure can be released to allow the scanner to move to another position and repeat the process. For round structures, this novel solution permits scanning around the circumference without having to use a collar with a fixed number of stationary magnetostrictive EMAT sensors, or to require adhering a magnetostrictive strip to the surface of the structure so an EMAT sensor can scan on the bonded strip. For other structures, the scanner can move freely on the part, pressure-couple the sensor on any position, and take readings as needed. Since this solution does not require the strip to be adhered to the structure, it can be applied to structures at very low or very high temperatures where adhesives would not work.

In order to facilitate pressure-coupling of the strip against the material, a thin coupling layer can be added between the strip and the structure. This coupling layer can be a malleable material such as aluminum or lead that helps coupling the magnetostrictive material against the structure and enhance the transfer of ultrasound.

Figure 3:
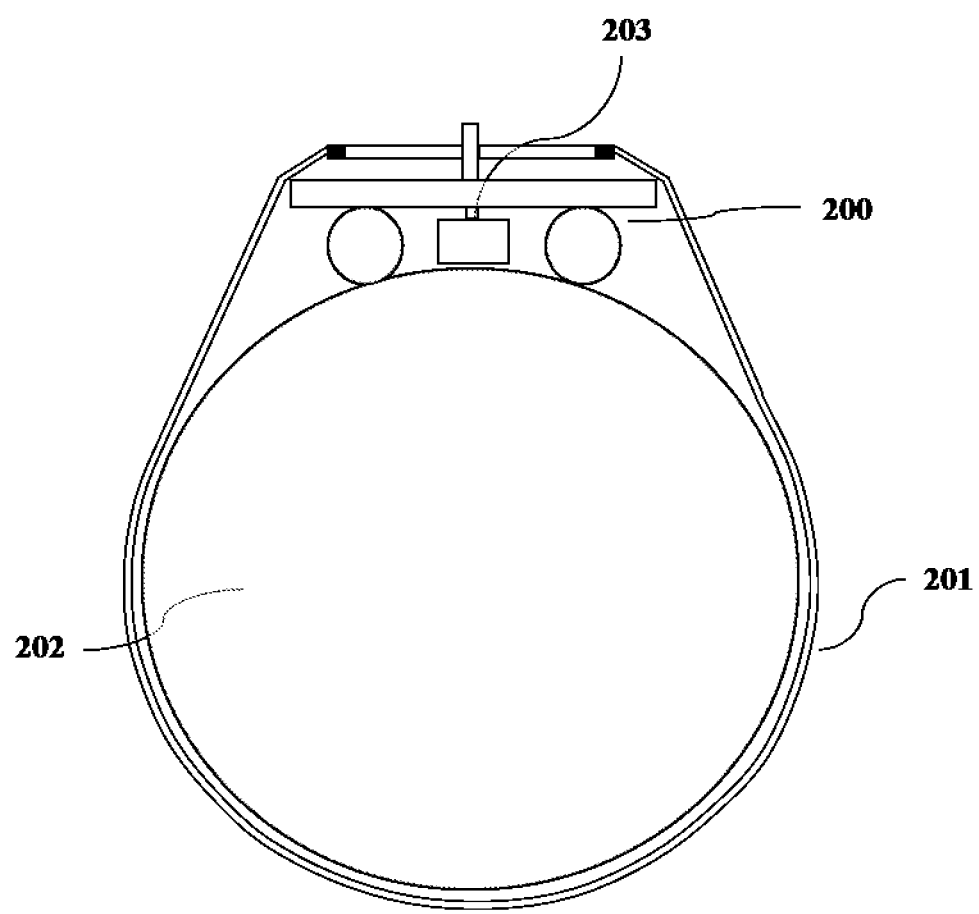
FIG. 3 is an illustration of a scanner with a chain wrapped around a round or semi-round structure that guides the scanner around the structure and helps keeping the scanner attached, while a manual or actuated mechanism tensions the chain to apply downward pressure on the magnetostrictive EMAT sensor at discrete points around the circumference.

In some embodiments, such as the embodiment illustrated in FIG. 3 the motorized scanner 200 scanning is assisted by a chain or strap 201 that can be used to help the scanner move on a round or semi-round structure, such as a pipe. The chain or strap can also be used to tension and pressure-couple the magnetostrictive EMAT sensor against the structure 202. Once the reading is made, the pressure is released and the scanner can move to another location across the structure and repeat the process. The built-in EMAT sensor 203 can be used to transmit and receive ultrasonic signals in pulse-echo mode, or it can be used just to transmit or to receive signals while another device on another location receives the signals transmitted by the scanner or transmits the signals that the scanner will collect.

Figure 4:
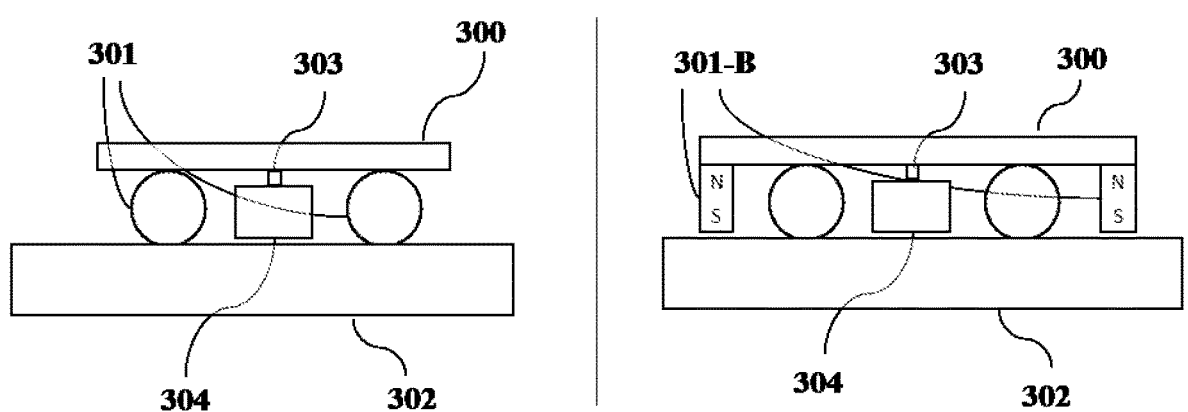
FIG. 4 is an illustration of a motorized scanner with magnetic wheels or magnetic bars that hold the scanner against a ferromagnetic structure, which includes a secondary mechanism to apply downward pressure on the magnetostrictive EMAT sensor at discrete points on the structure

In some embodiments, such as the embodiment illustrated in FIG. 4 the motorized scanner 300 uses magnetic wheels 301 or magnetic bars 301-B to hold the scanner onto a steel structure such as a pipe or tank 302. The scanner includes a separate mechanism 303 to apply downward pressure on the magnetostrictive EMAT sensor 304 and pressure-couple it against the surface.

Figure 5:
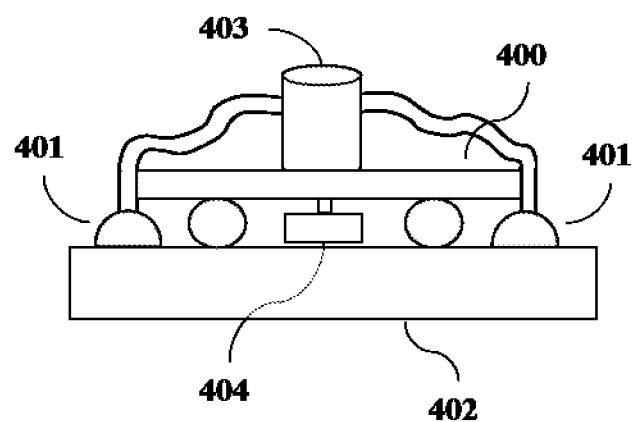
FIG. 5 is an illustration of a motorized scanner with a vacuum mechanism to be able to scan non-ferromagnetic structure, which a secondary vacuum mechanism to apply downward pressure on the magnetostrictive EMAT sensor at discrete points on the structure

In some embodiments, such as the embodiment illustrated in FIG. 5 the motorized scanner 400 uses vacuum holders 401 to attach onto a non-ferromagnetic structure 402. The scanner includes a separate or integrated vacuum mechanism 403 to pressure-couple the magnetostrictive EMAT sensor 404 on the structure.

Figure 6:
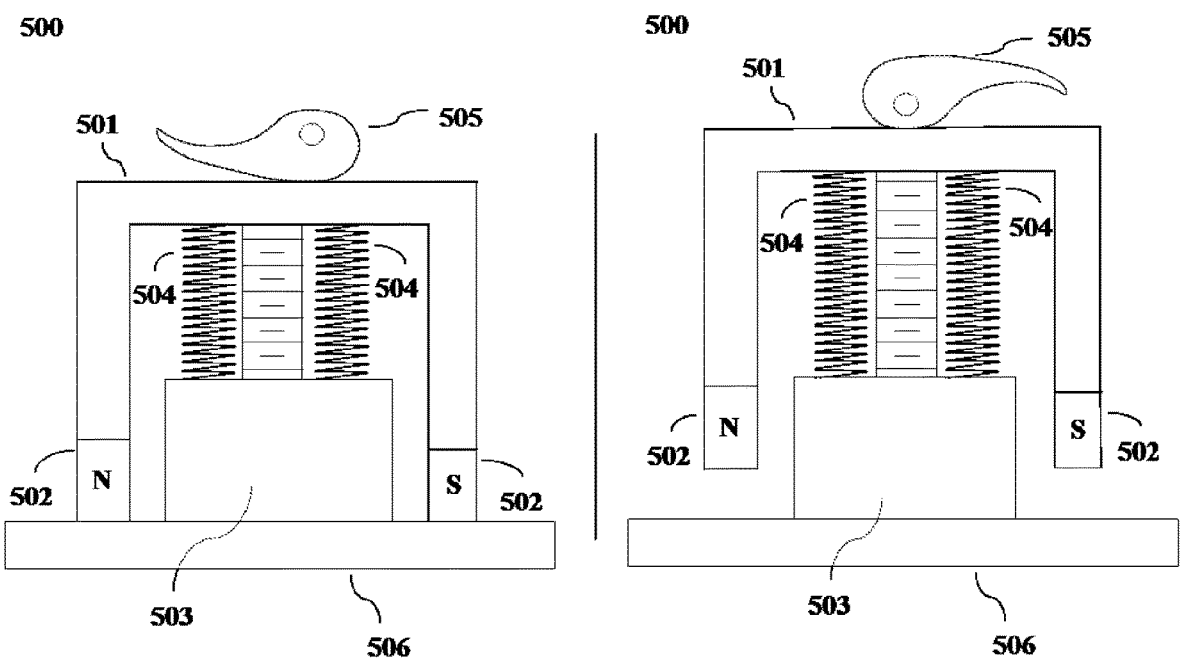
FIG. 6 is an illustration of a magnet and spring assisted mechanism to apply downward pressure on the magnetostrictive EMAT sensor on a ferromagnetic structure.

In some embodiments, such as the embodiment illustrated in FIG. 6 the device 500 that applies downward pressure on ferromagnetic materials uses a steel yoke 501 with strong magnets on the legs 502 that hold the magnetostrictive EMAT sensor 503 with springs 504 attached in the middle so the sensor is protruding slightly beyond the yoke. Once in the desired position, a manual device or an actuator 505 lowers the yoke holding the sensor on the part so the full force of the springs is applied on the magnetostrictive EMAT sensor to pressure-couple the sensor against the structure 506. The spring force is designed to be marginally lower than the attraction force of the magnetic yoke so the sensor stays in place with the full force of the springs during inspection, but can be removed easily by applying an upwards force on the yoke equivalent to the differential between the magnet attraction and spring counter-force. Careful balancing of the two forces will permit releasing the sensor from the structure with a fraction of the force applied on the sensor while attached to the structure.

The disclosed scanner can use linear encoders, 3D cameras, GPS or similar devices to provide accurate positioning on the structure for each ultrasonic measurement. By knowing accurately where the scanner is located, the signals from the different locations can be combined into one image using SAFT and other synthetic focusing techniques.

For pipes and other round structures prior art describes two different techniques to provide inspections using magnetostrictive EMAT.

One prior art technique uses a collar that is fastened around the structure and is mechanically tensioned or pressured with air to apply downward pressure on the stationary EMAT sensor or sensors and the strip, and thus provide mechanical pressure coupling against the pipe. On patent application US 2018/0217105A1 BORIGO et al describe such collar and tensioning mechanism. In this invention on the other hand, the EMAT sensor with a built-in strip is moved around the circumference to any position using the scanner, and once in position, it pushes the sensor against the pipe to pressure-couple and take readings in as many positions as needed. One advantage of the current invention for pipe inspection is that the number of positions using the scanner is not limited to the sensors available in the collar. Another advantage of this invention is that one scanner can handle any pipe diameter instead of requiring one custom collar per pipe size. Another advantage of this invention is that using different pressure-coupling mechanisms the scanner can be applied to flat and semi-flat surfaces where wrapping and tensioning against the structure is not possible.

Another prior art technique is described on patents US 2016/0238564A1 by OWENS, BORIGO, ROSE and LOPEZ and US 2016/0290965A1 by OWENS et al. Both patents involve an EMAT sensor scanner (a.k.a. magnetostrictive scanner probe) to scan a pipe where the strip has been previously attached to the structure. One advantage of the current invention is that the strip is built-into the sensor scanner so it doesn't need to be bonded to the structure separately. Another advantage of this invention is that the amount of strip required is limited to what is under the EMAT sensor, and does not require using long pieces of strip to cover the structure before scanning. Another advantage of this invention is that it permits scanning very cold and very hot parts where adhering the strip prior to scanning might not be possible.

What is claimed is:

1. A system for non-destructive inspection of a structure, comprising:
    a sensor construction including a biasing magnet, an RF coil, and a section of magnetostrictive strip under the RF coil creating a complete magnetostrictive EMAT sensor body;
    a motorized device that holds the sensor body and permits moving it to different inspection positions across a structure;
    a separate mechanism from the motorized device that can to apply downward pressure on the EMAT sensor body so as to pressure couple the sensor body to the wall of the structure once it has moved into an inspection position, and remove this pressure to allow the sensor body to decouple and travel to other inspection positions on the structure;
    a pulser-receiver instrument configured to generate a time-varying current in the RF coil which can be pulsed when the sensor body is coupled into an inspection position so as to generate EMAT generated ultrasonic waves on the magnetostrictive strip that are subsequently transferred into the structure due to the coupling pressure.

2. The system of claim 1, wherein the EMAT sensor is designed to generate ultrasonic waves used for non-destructive testing such as guided waves or bulk waves.

3. The system of claim 1, wherein the EMAT sensor comprises a single RF coil or multiple RF coils.

4. The system of claim 1, wherein a thin layer of malleable material is placed between the magnetostrictive strip and the structure to enhance coupling.

5. The system of claim 1, wherein the downward pressure on the EMAT sensor is achieved by hand or using an automatic actuator.

6. The system of claim 1, wherein the motorized device uses a chain, cable or strap that wraps around the structure and holds the device to be able to apply downward pressure on the EMAT sensor against the structure without dislodging the device.

7. The system of claim 1, wherein the motorized device uses magnetic wheels or tracks to hold the device onto the structure to be able to apply downward pressure on the EMAT sensor against the structure without dislodging the device.

8. The system of claim 1, wherein the motorized device uses vacuum to hold the device onto the structure to be able to apply downward pressure on the EMAT sensor against the structure without dislodging the device.

* * * * *